United States Patent
Conti

(10) Patent No.: US 7,853,997 B2
(45) Date of Patent: Dec. 14, 2010

(54) METHOD AND SYSTEM FOR A MULTI-SHARING SECURITY FIREWALL

(75) Inventor: Gregory R. Conti, Saint Paul (FR)

(73) Assignee: Texas Instruments Incorporated, Dallas, TX (US)

( * ) Notice: Subject to any disclaimer, the term of this patent is extended or adjusted under 35 U.S.C. 154(b) by 540 days.

(21) Appl. No.: 11/272,532

(22) Filed: Nov. 11, 2005

(65) Prior Publication Data

US 2007/0011419 A1    Jan. 11, 2007

(30) Foreign Application Priority Data

Jul. 7, 2005    (EP)    ................... 05291479

(51) Int. Cl.
*G06F 9/00* (2006.01)
*G06F 15/16* (2006.01)
*G06F 17/00* (2006.01)

(52) U.S. Cl. ................. 726/11; 713/153; 713/154
(58) Field of Classification Search .............. 726/11
See application file for complete search history.

(56) References Cited

U.S. PATENT DOCUMENTS

| | | | |
|---|---|---|---|
| 4,104,721 A * | 8/1978 | Markstein et al. ........... 711/164 |
| 5,845,129 A | 12/1998 | Wendorf et al. |
| 6,212,599 B1 * | 4/2001 | Baweja et al. ............... 711/106 |
| 6,595,415 B2 * | 7/2003 | Niwata et al. ............... 235/380 |
| 6,714,939 B2 * | 3/2004 | Saldanha et al. ............ 707/102 |
| 6,811,608 B1 * | 11/2004 | Stewart et al. ............... 117/68 |
| 6,901,401 B2 * | 5/2005 | Bangel et al. .................. 707/9 |
| 7,392,378 B1 * | 6/2008 | Elliott ......................... 713/153 |
| 2002/0184046 A1 * | 12/2002 | Kamada et al. ................ 705/1 |
| 2003/0018860 A1 | 1/2003 | Krueger |
| 2003/0140245 A1 * | 7/2003 | Dahan et al. ................ 713/200 |
| 2003/0188184 A1 | 10/2003 | Strongin et al. |
| 2004/0003262 A1 | 1/2004 | England et al. |
| 2004/0039944 A1 * | 2/2004 | Karasaki ..................... 713/201 |
| 2004/0143714 A1 | 7/2004 | Watt |
| 2004/0143720 A1 | 7/2004 | Mansell et al. |

(Continued)

FOREIGN PATENT DOCUMENTS

DE    199 25 195 A1    12/2000

(Continued)

*Primary Examiner*—Farid Homayounmehr
(74) *Attorney, Agent, or Firm*—Ronald O. Neerings; Wade James Brady, III; Frederick J. Telecky, Jr.

(57) ABSTRACT

Systems and methods for a multi-sharing security firewall are provided. Embodiments of a memory security firewall apparatus are provided that include region configuration logic, region selection logic, and access validation logic. The region configuration logic is operable to define memory protection regions of a target memory, each memory protection region having two initiator groups and two sets of access attribute combinations, one for each initiator group. The region selection logic is operable to select a memory protection region that includes the address of a target memory access request from a system initiator. The access validation logic is operable to allow the requested memory access if the system initiator is in one of the initiator groups of the memory protection region selected by the region selection logic, and the combination of access attributes is in a set of access attribute combinations of the memory protection region.

26 Claims, 9 Drawing Sheets

U.S. PATENT DOCUMENTS

| | | |
|---|---|---|
| 2004/0170046 A1 | 9/2004 | Belnet et al. |
| 2004/0177261 A1 | 9/2004 | Watt et al. |
| 2004/0177269 A1 | 9/2004 | Belnet et al. |
| 2006/0021035 A1* | 1/2006 | Conti et al. .................... 726/22 |
| 2006/0117174 A1* | 6/2006 | Lee ............................ 713/154 |
| 2006/0265746 A1* | 11/2006 | Farley et al. .................. 726/22 |
| 2009/0037998 A1* | 2/2009 | Adhya et al. .................. 726/11 |
| 2010/0122334 A1* | 5/2010 | Stanzione et al. ............. 726/11 |

FOREIGN PATENT DOCUMENTS

| | | |
|---|---|---|
| EP | 0 472 487 A2 | 2/1992 |
| EP | 1 089 156 A2 | 4/2001 |
| EP | 1 262 857 A2 | 12/2002 |
| GB | 2 356 469 A | 5/2001 |

* cited by examiner

| 1 | If (RESET=0){P_Rx=Px} --PRIORITY/LOCKING REGISTER RESET VALUE |
| 2 | Else |
| 3 | { |
| 4 | P_R0=0 |
| 5 | P_Rx=1 |
| 6 | P_R1=2 |
| 7 | If (L_R{2-7}=1 and MSecure=1){P_R{2-7}=4} |
| 8 | If (L_R{2-7}=1 and MSecure=0){P_R{2-7}=3} |
| 9 | If (L_R1=1 and MSecure=0)　　{P_R1=3} |
| 10 | If (L_R1=1 and MSecure=1)　　{P_R1=5} |
| 11 | Px=P_Rx--UPDATE PRIORITY/LOCKING REGISTER |
| 12 | } |

FIG. 3

| 1  | If (Start_R1 ≤ MAddr ≤ End_R1) | {M_R1=0x1} |
|----|-------------------------------|------------|
| 2  | Else                          | {M_R1=0x0} |
| 3  | If (Start_R2 ≤ MAddr ≤ End_R2) | {M_R2=0x2} |
| 4  | Else                          | {M_R2=0x0} |
| 5  | If (Start_R3 ≤ MAddr ≤ End_R3) | {M_R3=0x3} |
| 6  | Else                          | {M_R3=0x0} |
| 7  | If (Start_R4 ≤ MAddr ≤ End_R4) | {M_R4=0x4} |
| 8  | Else                          | {M_R1=0x0} |
| 9  | If (Start_R5 ≤ MAddr ≤ End_R5) | {M_R5=0x5} |
| 10 | Else                          | {M_R5=0x0} |
| 11 | If (Start_R6 ≤ MAddr ≤ End_R6) | {M_R6=0x6} |
| 12 | Else                          | {M_R6=0x0} |
| 13 | If (Start_R7 ≤ MAddr ≤ End_R7) | {M_R7=0x7} |
| 14 | Else                          | {M_R7=0x0} |

*FIG. 5A*

| 1 | Overlap_P5=Ptable[P5][M_R7]+...+Ptable[P5][M_R1] | |
|---|---|---|
| 2 | Overlap_P4=Ptable[P4][M_R7]+...+Ptable[P4][M_R1] | |
| 3 | Overlap_P3=Ptable[P3][M_R7]+...+Ptable[P3][M_R1] | |
| 4 | Overlap_P2=Ptable[P2][M_R7]+...+Ptable[P2][M_R1] | |
| 5 | Overlap_P1=Ptable[P1][M_R7]+...+Ptable[P1][M_R1] | |
| 6 | | |
| 7 | Overlap_P3_int=Overlap_P5&Overlap_P4 | |
| 8 | Overlap_P2_int=Overlap_P5&Overlap_P4&Overlap_P3 | |
| 9 | Overlap_P1_int=Overlap_P5&Overlap_P4&Overlap_P3&Overlap_P2 | |
| 10 | | |
| 11 | If(Overlap_P5>1) | {Violation=1} |
| 12 | Else If (Overlap_P4>1 and Overlap_P5=0) | {Violation=1} |
| 13 | Else If (Overlap_P3>1 and Overlap_P3_int=0) | {Violation=1} |
| 14 | Else If (Overlap_P2>1 and Overlap_P2_int=0) | {Violation=1} |
| 15 | Else If (Overlap_P1>1 and Overlap_P1_int=0) | {Violation=1} |
| 16 | Else | {Violation=0} |
| 17 | EndIf | |
| 18 | | |
| 19 | If (Ptable[P5][M_R7]=1 | {Rout=0x7} |
| 20 | Else If (Ptable[P5][M_R6]=1 | {Rout=0x6} |
| 21 | Else If (Ptable[P5][M_R5]=1 | {Rout=0x5} |
| 22 | Else If (Ptable[P5][M_R4]=1 | {Rout=0x4} |
| 23 | Else If (Ptable[P5][M_R3]=1 | {Rout=0x3} |
| 24 | Else If (Ptable[P5][M_R2]=1 | {Rout=0x2} |
| 25 | Else If (Ptable[P5][M_R1]=1 | {Rout=0x1} |
| 26 | Else If (Ptable[P4][M_R7]=1 | {Rout=0x7} |
| 27 | Else If (Ptable[P4][M_R6]=1 | {Rout=0x6} |
| 28 | Else If (Ptable[P4][M_R5]=1 | {Rout=0x5} |
| 29 | Else If (Ptable[P4][M_R4]=1 | {Rout=0x4} |
| 30 | Else If (Ptable[P4][M_R3]=1 | {Rout=0x3} |
| 31 | Else If (Ptable[P4][M_R2]=1 | {Rout=0x2} |
| 32 | Else If (Ptable[P4][M_R1]=1 | {Rout=0x1} |

FIG. 5B

| 33 | Else If (Ptable[P3][M_R7]=1 | {Rout=0x7} |
|---|---|---|
| 34 | Else If (Ptable[P3][M_R6]=1 | {Rout=0x6} |
| 35 | Else If (Ptable[P3][M_R5]=1 | {Rout=0x5} |
| 36 | Else If (Ptable[P3][M_R4]=1 | {Rout=0x4} |
| 37 | Else If (Ptable[P3][M_R3]=1 | {Rout=0x3} |
| 38 | Else If (Ptable[P3][M_R2]=1 | {Rout=0x2} |
| 39 | Else If (Ptable[P3][M_R1]=1 | {Rout=0x1} |
| 40 | Else If (Ptable[P4][M_R7]=1 | {Rout=0x7} |
| 41 | Else If (Ptable[P2][M_R6]=1 | {Rout=0x6} |
| 42 | Else If (Ptable[P2][M_R5]=1 | {Rout=0x5} |
| 43 | Else If (Ptable[P2][M_R4]=1 | {Rout=0x4} |
| 44 | Else If (Ptable[P2][M_R3]=1 | {Rout=0x3} |
| 45 | Else If (Ptable[P2][M_R2]=1 | {Rout=0x2} |
| 46 | Else If (Ptable[P2][M_R1]=1 | {Rout=0x1} |
| 47 | Else If (Ptable[P1][M_R7]=1 | {Rout=0x7} |
| 48 | Else If (Ptable[P1][M_R6]=1 | {Rout=0x6} |
| 49 | Else If (Ptable[P1][M_R5]=1 | {Rout=0x5} |
| 50 | Else If (Ptable[P1][M_R4]=1 | {Rout=0x4} |
| 51 | Else If (Ptable[P1][M_R3]=1 | {Rout=0x3} |
| 52 | Else If (Ptable[P1][M_R2]=1 | {Rout=0x2} |
| 53 | Else If (Ptable[P1][M_R1]=1 | {Rout=0x1} |
| 54 | Else | {Rout=0x0} |
| 55 | EndIf | |
| 56 | | |
| 57 | Rout_mux=Violation&Rout | |
| 58 | | |

FIG. 6

| 1 | Match_G1=group1[SEL_Init_ID] |
|---|---|
| 2 | Match_G2=group2[SEL_Init_ID] |
| 3 | |
| 4 | SEL_Group_ID=Match_G2&Match_G1 |
| 5 | Group_Security_Violation=Match_G1 AND MATCH_G2 |
| 6 | |
| 7 | Comments: |
| 8 | SEL_Group_ID="00" |
| 9 | → NO ACCESS GROUP |
| 10 | → NO GROUP SECURITY VIOLATION |
| 11 | |
| 12 | SEL_Group_ID="11" |
| 13 | → NO ACCESS GROUP |
| 14 | → GROUP SECURITY VIOLATION: INITIATOR IN BOTH GROUP 1 AND GROUP 2 |

FIG. 7

| 1 | MReqInfo_int[4]=MReqSecure |
|---|---|
| 2 | MReqInfo_int[3]=MReqDebug |
| 3 | MReqInfo_int[2]=MReqSupervisor |
| 4 | MReqInfo_int[1]=MReqType |
| 5 | |
| 6 | If MCmd=READ |
| 7 | { |
| 8 | MReqInfo_int[0]=0 |
| 9 | } |
| 10 | Else If MCmd=WRITE |
| 11 | { |
| 12 | MReqInfo_int[0]=1 |
| 13 | } |
| 14 | EndIf |

| 1 | If Req_Info[Sel_Attibute]=1 |
| --- | --- |
| 2 | { |
| 3 | Access_Allowed |
| 4 | } |
| 5 | Else |
| 6 | { |
| 7 | Security_Violation |
| 8 | } |
| 9 | EndIf |

METHOD AND SYSTEM FOR A MULTI-SHARING SECURITY FIREWALL

This application claims priority under 35 USC §(e)(1) of European Application Number 05 291 479.3, filed on 7 Jul. 2005.

BACKGROUND

Mobile electronic devices such as personal digital assistants (PDAs) and digital cellular telephones are increasingly used for electronic commerce (e-commerce) and mobile commerce (m-commerce). Programs that execute on the mobile devices to implement e-commerce and/or m-commerce functionality may need to operate in a secure mode to reduce the likelihood of attacks by malicious programs (e.g., virus programs) and to protect sensitive data.

For security reasons, at least some processors provide two levels of operating privilege: a first level of privilege for user programs; and a higher level of privilege for use by the operating system. However, the higher level of privilege may or may not provide adequate security for m-commerce and e-commerce, given that this higher level relies on proper operation of operating systems with highly publicized vulnerabilities. In order to address security concerns, some mobile equipment manufacturers implement yet another third level of privilege, or secure mode, that places less reliance on corruptible operating system programs, and more reliance on hardware-based monitoring and control of the secure mode. An example of one such system may be found in U.S. Patent Publication No. 2003/0140245, entitled "Secure Mode for Processors Supporting MMU and Interrupts."

In addition to this secure mode, various hardware-implemented security firewalls and other security monitoring components have been added to the processing systems used in mobile electronic devices to further reduce the vulnerability to attacks. Examples of these security improvements may be found in U.S. patent application Ser. No. 10/961,756, entitled "System and Method for Secure Mode for Processors and Memories on Multiple Semiconductor Dies Within a Single Semiconductor Package," Ser. No. 10/961,755, entitled "Method and System of Ensuring Integrity of a Secure Mode Entry Sequence," Ser. No. 10/961,344, entitled "System and Method of Identifying and Preventing Security Violations Within a Computing System," Ser. No. 10/961,748, entitled "Method and System of Verifying Proper Execution of a Secure Mode Entry Sequence," and European Patent Application EP 04292405.0, entitled "Method and System for Detecting a Security Violation Using an Error Correction Code," all of which are hereby incorporated by reference.

In some implementations, one or more hardware-implemented security firewalls block or allow access to a system component in a mobile electronic device by another component (or by software executing on that component) depending on a set of rules. These rules establish relationships between pairs of components (i.e., system initiators and system targets) and the mode of operation (e.g., secure or non-secure). Such rules may be implemented either in hardware or software in the form of a permission table, wherein the component attempting access is crossed-referenced to an address range of the component to which access is desired. If the component requesting access does not have the appropriate access rights for the requested operation and for the current mode of operation, the firewall signals a security violation and the access is blocked. While these security firewall implementations help reduce the vulnerability of a mobile electric device to attacks, they have limitations that need to be addressed.

SUMMARY

Accordingly, there are disclosed herein systems and methods for a multi-sharing security firewall. Embodiments provide a method for controlling access to a target memory that includes configuring a plurality of memory protection regions in a target memory of a system having a plurality of system initiators and receiving a memory access request from a system initiator of the plurality of system initiators. The configuring comprises defining a first initiator group with a first set of access attribute combinations and a second initiator group with a second set of access attribute combinations for each memory protection region of the plurality of memory protection regions. The first and second initiator groups comprise one or more of the plurality of system initiators. The memory access request comprises an address in the target memory and a combination of access attributes. The method further includes validation of the memory access request, this validation including if the address is in a first memory protection region of the plurality of memory protection regions, allowing the memory access request if the system initiator is in the first initiator group of the first memory protection region and the combination of access attributes is in the first set of access attribute combinations of the first initiator group, and allowing the memory access request if the system initiator is in the second initiator group of the first memory protection region and the combination of access attributes is in the second set of access attribute combinations of the second initiator group.

In other embodiments, a system is provided that includes a plurality of system initiators coupled to an interconnect of the system, a target memory coupled to the interconnect, and a memory security firewall coupled to the interconnect. The memory security firewall is operable to configure a plurality of memory protection regions in the target memory and to receive a memory access request from a system initiator of the plurality of system initiators, the memory access request including an address in the target memory and a combination of access attributes. The configuration comprises defining a first initiator group with a first set of access attribute combinations and a second initiator group with a second set of access attribute combinations for each memory protection region of the plurality of memory protection regions, wherein the first and second initiator groups comprise one or more of the plurality of system initiators, The memory security firewall is further operable to determine whether the address is in a first memory protection region of the plurality of memory protection regions, and if the address is in the first memory protection region, to block the memory access request unless the system initiator is in the first initiator group of the first memory protection region and the combination of access attributes is in the first set of access attribute combinations of the first initiator group, or the system initiator is in the second initiator group of the first memory protection region and the combination of access attributes is in the second set of access attribute combinations of the second initiator group.

Other embodiments provide a memory security firewall apparatus that includes region configuration logic, region selection logic coupled to the region configuration logic and coupled to an interconnect of the system to receive an address of a memory access request from a system initiator, and access validation logic coupled to the region selection logic and coupled to the interconnect to receive an initiator id of the system initiator and to receive a combination of access attributes of the memory access request. The region configuration logic is operable to define a plurality of memory protection regions of a target memory of a system, each memory protection region having a first initiator group with a first set of access attribute combinations, and a second initiator group with a second set of access attribute combinations. The region selection logic is operable to select a memory protection region of the plurality of memory protection regions that includes the address. The access validation logic is operable to allow the requested memory access if the system initiator is the first initiator group of the memory protection region selected by the region selection logic, and the combination of access attributes is in the first set of access combinations, or if the system initiator is in the second initiator group of the memory protection region selected by the region selection logic, and the combination of access attributes is in the second set of access combinations.

BRIEF DESCRIPTION OF THE DRAWINGS

For a detailed description of exemplary embodiments of the invention, reference will now be made to the accompanying drawings in which:

FIGS. 2A-2C show a multi-sharing memory security firewall subsystem in accordance with one or more embodiments.

FIGS. 3, 4, 5A, 5B, 6, 7, and 8 show pseudo code illustrating the operation of portions of a multi-sharing memory security firewall subsystem in accordance with one or more embodiments.

FIG. 9 shows a flow chart of a method in accordance with one or more embodiments.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to. . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Inasmuch as the systems and methods described herein were developed in the context of a mobile computing system, the description herein is based on a mobile computing environment. However, the discussion of the various systems and methods in relation to a mobile computing environment should not be construed as a limitation as to the applicability of the systems and methods described herein to only mobile computing environments. One of ordinary skill in the art will appreciate that these systems and methods may also be implemented in other computing environments such as desktop computers, laptop computers, network servers, and mainframe computers.

Figure 1:
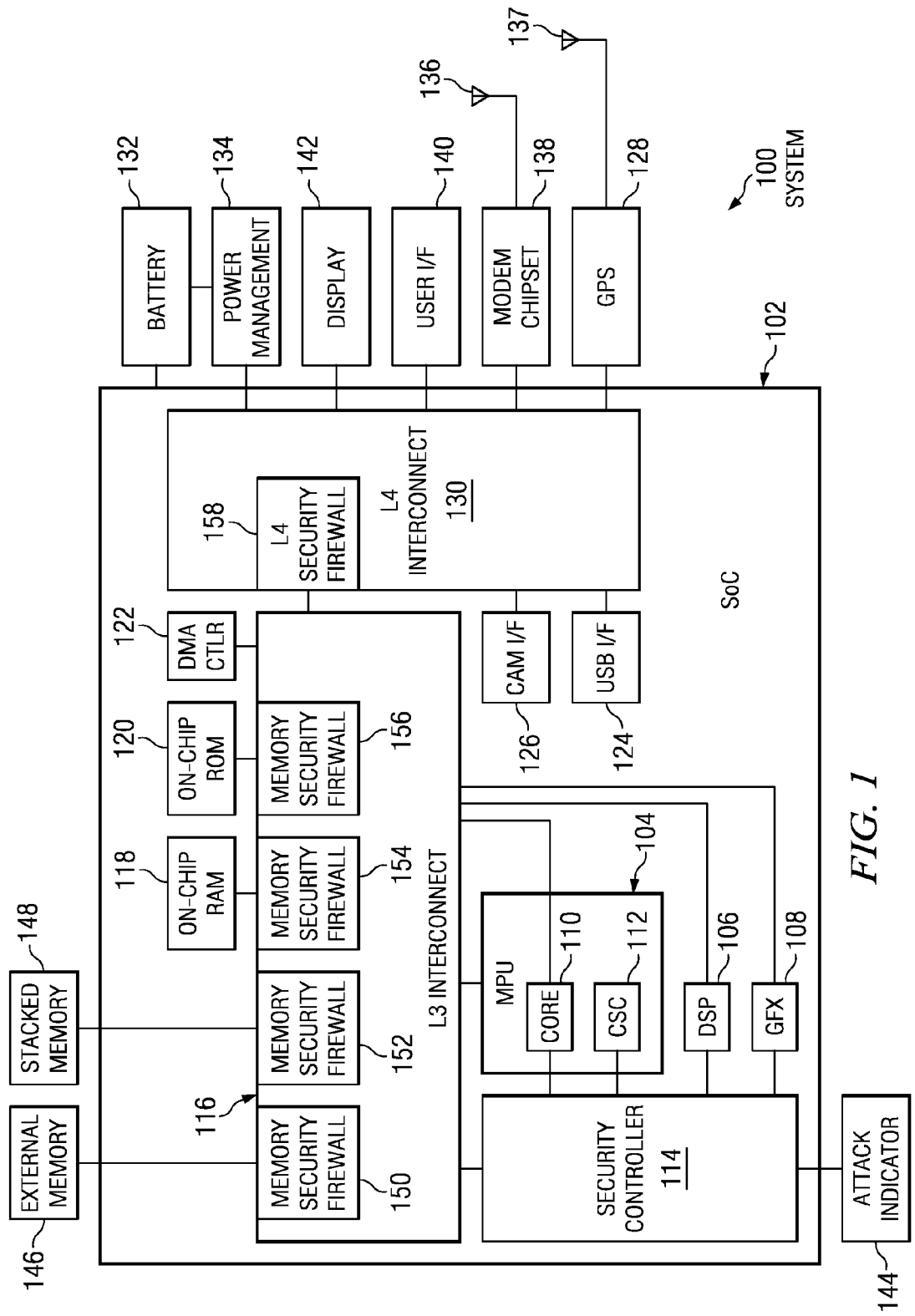
FIG. 1 shows a system in accordance with one or more embodiments.

FIG. 1 shows a system 100 constructed in accordance with one or more embodiments of the invention. In accordance with at least some embodiments, the system 100 may be a mobile device such as a cellular telephone, personal digital assistant (PDA), text messaging system, and/or a device that combines the functionality of a messaging system, personal digital assistant and a cellular telephone.

The system 100 includes a multiprocessing unit (MPU) 104 coupled to various other system components by way of data and instruction busses and security firewalls (e.g., L3 interconnect 116, and L4 interconnect 130). The MPU 104 includes a processor core (core) 110 that executes programs. In some embodiments, the core 110 has a pipelined architecture. The MPU 104 further includes a core security controller (CSC) 112, which aids the MPU 104 in entering a secure mode for execution of secure programs on the core 110. The core security controller 112 may also monitor operation during secure mode to ensure secure operation, and during non-secure mode to prevent access to secure components of the system 100.

The core 110 may be any processor suitable for integration into a system on a chip (SoC), such as the ARM 1136 series of processors. In other embodiments, the core 110 may be a processor that includes some or all of the functionality of the core security controller 112 as described herein, such as the ARM 1176 series of processors. The ARM 1136 and 1176 technology may be obtained from ARM Holdings plc of Cambridge, United Kingdom, and/or ARM, Inc. of Austin, Tex., USA.

The system 100 also includes a digital signal processor (DSP) 106 coupled to the MPU 104 by way of the L3 interconnect 116. The DSP 106 aids the MPU 104 by performing task-specific computations, such as graphics manipulation and speech processing. The DSP 106 may have its own core and its own core security controller (not specifically shown). A graphics accelerator (GFX) 108 may also couple both to the MPU 104 and the DSP 106 by way of the L3 interconnect 116. The graphics accelerator 108 performs necessary computations and translations of information to allow display of information, such as on display device 142. The graphics accelerator 108, like the MPU 104 and the DSP 106, may have its own core and its own core security controller (not specifically shown). As with the MPU 104, both the DSP 106 and the graphics accelerator 108 may each independently enter a secure mode to execute secure programs on their respective cores.

The system 100 also includes a direct memory access controller (DMA CTLR) 122 coupled to on-chip RAM 118, on-chip ROM 120, external memory 146, and stacked memory 148 by way of the L3 interconnect 116. The direct memory access controller 122 controls access to and from the on-chip memory and the external memory by any of the other system components such as, for example, the MPU 104, the DSP 106 and the graphics accelerator 108. The memory components may be any suitable memory, such as synchronous RAM, RAMBUS™-type RAM, programmable ROMs (PROMs), erasable programmable ROMs (EPROMs), and electrically erasable programmable ROMs (EEPROMs). The stacked memory 148 may be any suitable memory that is integrated within the same semiconductor package as system-on-a-chip (SoC) 102, but on a semiconductor die separate from the semiconductor die of the system-on-a-chip 102.

The system 100 also includes various interfaces and components coupled to the various subsystems of the SoC 102 by way of the L4 interconnect 130. The interfaces include a USB interface (USB I/F) 124 that allows the system 100 to couple to and communicate with external devices, a camera interface (CAM I/F) 126 which enables camera functionality fo capturing digital images, and a user interface (User I/F) 140, such as a keyboard, keypad, or touch panel, through which a user may input data and/or messages. The components include a modem chipset 138 coupled to an external antenna 136, a global positioning system (GPS) circuit 128 likewise coupled to an external antenna 137, and a power management unit 134 omtrolling a battery 132 that provides power to the various components of the system 100.

Many of the components illustrated in FIG. 1, while also available as individual integrated circuits, may be integrated or constructed onto a single semiconductor die. Thus, the MPU 104, digital signal processor 106, memory controller 122, along with some or all of the remaining components, may be integrated onto a single die, and thus may be integrated into the system 100 as a single packaged component. Having multiple devices integrated onto a single die, especially devices comprising an MPU 104 and on-chip memory (e.g., on-chip RAM 118 and on-chip ROM 120), is generally referred to as a system-on-a-chip (SoC) 102 or a megacell. While using a system-on-a-chip may be preferred, obtaining the benefits of the systems and methods as described herein does not require the use of a system-on-a-chip.

Each of the core security controllers (e.g., core security controller 112) is implemented as a hardware-based state machine that monitors system parameters of each of the respective processor cores (e.g., core 110). A core security controller allows the secure mode of operation to initiate such that a processor may execute secure programs from secure memory (e.g., from a secure address range of the on-chip memory) and access secure resources (e.g., control registers for secure channels of the direct memory access controller 122). For more detailed description of embodiments of a core security controller, including the secure mode of operation, the signals that may be monitored to make the decision as to whether to enter the secure mode, and a state diagram for operation, reference may be had to United States Patent Application Publication No. 2003/0140245A1, published Jul. 24, 2003, which is assigned to the same Assignee as the present specification, and which is incorporated by reference herein as if reproduced in full below.

The L3 interconnect 116 and the L4 interconnect 130 of the system 100 each include busses linking the various components of the system 100 and security firewalls (e.g., memory security firewalls 150-156 and L4 security firewall 158) that provide additional protection beyond the protection provided by the core security controllers. The security firewalls provide isolation between components of the system 100 that are capable of operating at different security levels. The security firewalls are integrated into the busses linking the various components of the system 100 to provide control over request/response mechanisms within the busses. Such request/response mechanisms allow components requesting access (i.e., initiators) to access other components, (i.e., targets) only if access is allowed by the security firewall integrated into the bus coupling the components. Thus, for example, the direct memory access controller 122 may request access to the stacked memory 148, but will only be granted access by the memory security firewall 152 integrated into the L3 interconnect 116 if access does not violate a security constraint (i.e., has the appropriate access attributes as defined in the memory security firewall). Or, if an attempt is made by a USB device coupled to the USB port 124 to access a secure address range of the on-chip RAM 118, the L4 security firewall 158 may deny access.

As is further explained below in reference to FIGS. 2A-2C, in accordance with at least some embodiments, the memory security firewalls 150-156 may be implemented using digital hardware. Such hardware utilizes initiator and target identification information and access attributes placed on the bus portion of the L3 interconnect 116 as input. In some embodiments, these access attributes include a security level attribute indicating whether the access is public or secure, a mode attribute indicating whether the access is made in functional or debug mode, a privilege attribute indicted whether the access is made in user or supervisor mode, a data/opcode attribute indicating whether the access is a data transfer or an opcode fetch, and a read/write attribute indicating whether the access is a read request or a write request. Logic within a memory security firewall uses the identification information and the access attributes to determine whether or not access to the target by the initiator is granted.

Each of the memory security firewalls 150-156 allows the target memory space it protects to be split into multiple shared memory protection regions. In some embodiments, the size of the memory space allocated to each memory protection region must be in multiples of 64K bytes and the start and end address of each memory space must be aligned on 64K byte boundaries. In other embodiments, the size of each memory protection region may be any power of 2 bytes (e.g., 2K bytes, 4K bytes, 16K bytes, etc.)

Each of the memory protection regions may be shared by two groups of initiators, which may be defined for each protection region. That is, each memory protection region has associated with it two groups of initiators that share access to the region. Further, each of the initiator groups of a protection region may have its own set of access permissions. Therefore, a memory security firewall will only allow access to a memory protection region in the target memory space the firewall protects if the initiator of the access is included in one of the two initiator groups defined for the protection region, and the access request is accompanied by a combination of access attributes or permissions that corresponds to a combination included in the set of access permissions of the initiator group that includes the initiator. If the access attempt does not meet all of these criteria, the access request is blocked and a security violation response may be executed.

In some embodiments, the memory protection regions may be defined to overlap, thus requiring an approach for deciding which access permissions should be used to determine if an access request is to be allowed when the address of an access request is in an overlapped area. In such embodiments, each memory protection region is assigned a security priority level. When the address of an access request falls within an overlapped area of the target memory space, the memory security firewall uses the access permissions of the region including the overlapped area that has the highest priority. If the overlapping regions have the same security priority level, the access is blocked and a security violation response may be executed.

The security firewalls, the core security controllers (e.g., core security controller 112), and the attack indicator 144 each couple to the security controller 114. The security controller 114 acts as a hub for the detection of security violations, receiving security violation signals from the core security controllers and the firewalls. If the security controller 114 receives a security violation signal, it may respond by alerting the user that a violation has been detected, such as by activating the attack indicator 144, by causing one or more core security controllers (e.g., core security controller 112) to initiate one or more security response sequences (described below), such as blocking the current access from reaching the target memory or target component, and/or by logging the source of the security violation. The attack indicator 144 may be a visible or audible (or both) indicator such as an LED or a buzzer.

The response of the security controller 114 is determined based on pre-selected options set when the system 100 is booted and/or on the source of the security violation signal (e.g., a firewall). For example, if a firewall has already blocked an attempted illegal access, the security controller 114 may simply log the fact that the security violation occurred as no further action is needed. Exemplary embodiments of computer systems including a security controller, firewalls, and core security controllers are provided in U.S. patent application Ser. No. 10/961,344, entitled "System and Method of Identifying and Preventing Security Violations within a Computing System" which is hereby incorporated by reference.

The core security controller 112 may initiate one or more security response sequences when notified by the security controller 114 that a security violation has occurred. The available security response sequences include blocking or stopping execution of the violating operation, blocking future execution of the offending program (e.g., by deleting the program from the system 100), resetting the core 110, or notifying the core 110 to enter debug mode.

To block or stop execution of the violating operation, the core security controller 112 may abort an instruction presented to the core 110 by asserting a native processor hardware-based abort (e.g., a pre-fetch abort). The hardware-based abort prevents the offending instruction from executing and also may flush prefetch units, internal instruction and/or data prediction mechanisms, and pipeline stages of the core 110 that may contain additional program instructions that are part of a violation or attack. Such a flush causes the context of a malicious program to be cleared, which terminates execution of the program. Because the abort is hardware-based and not vulnerable to control or interference by software, a malicious program may have great difficulty intercepting or bypassing a security response sequence thus implemented.

To block future execution of the offending program, the core security controller 112 may generate an interrupt to the core 110 to trigger an interrupt service routine that launches one or more software programs (e.g., anti-virus software) that can identify the source of the malicious program and prevent future execution of the program (e.g. by deleting the source from the system 100). In some embodiments of the invention, a high-performance, high-priority processor interrupt may be used (e.g., the FIQ interrupt of the ARM 1136 or 1176 series processor) to trigger an interrupt service routine. This interrupt may also be implemented in the system such that the system will automatically enter secure mode before entering the interrupt service routine, thus guaranteeing that the interrupt service routine is protected from a software attack initiated in public mode (e.g., the secure FIQ of the ARM 1176 series processor).

To reset the core 110, the core security controller 112 causes a processor or warm reset signal to be sent to the core 110. To notify the core 110 to enter debug mode, the core security controller 112 causes a signal to be sent to the core 110 that causes the core 110 operate in a debug state.

Figure 2A:
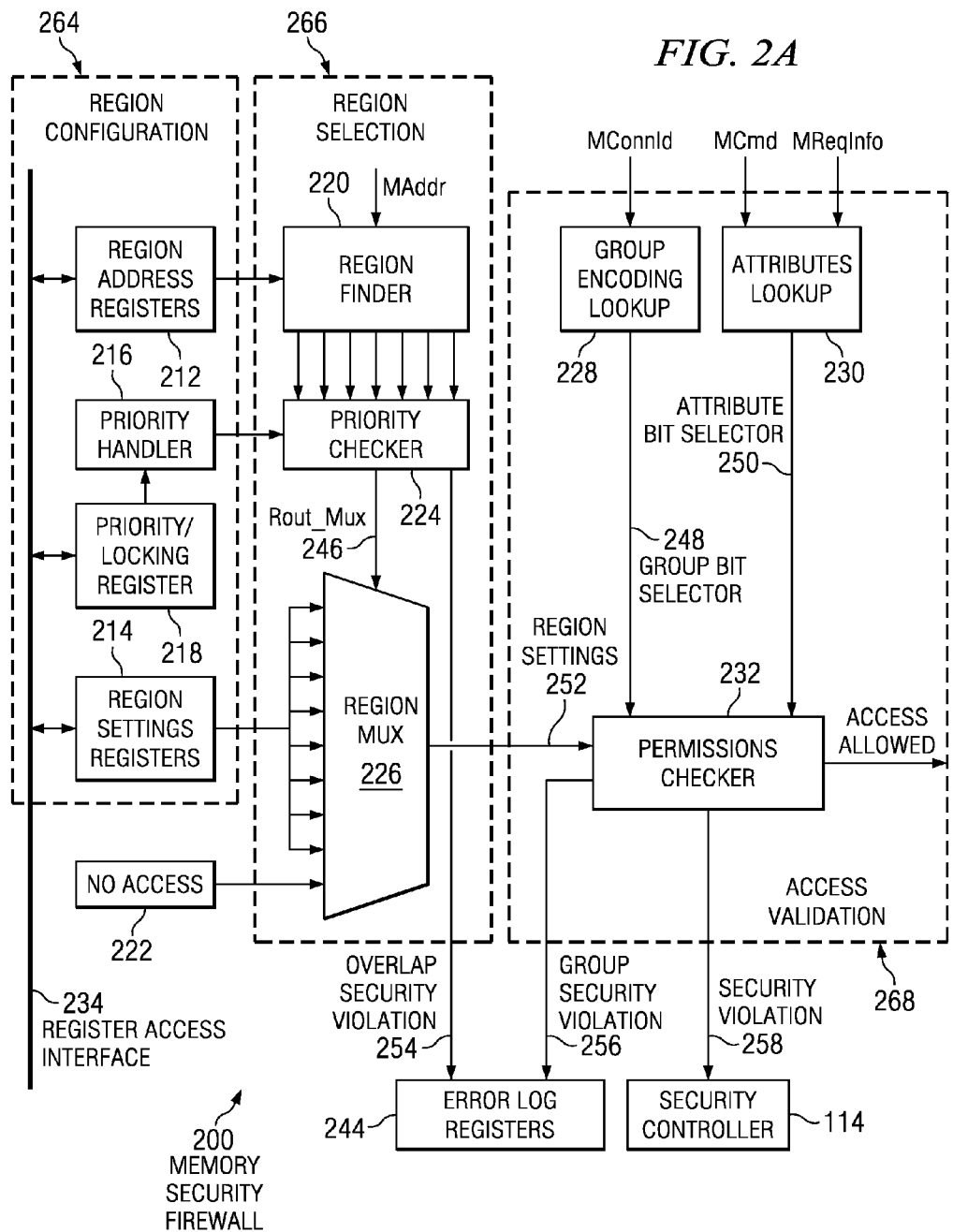
Figure 2B:
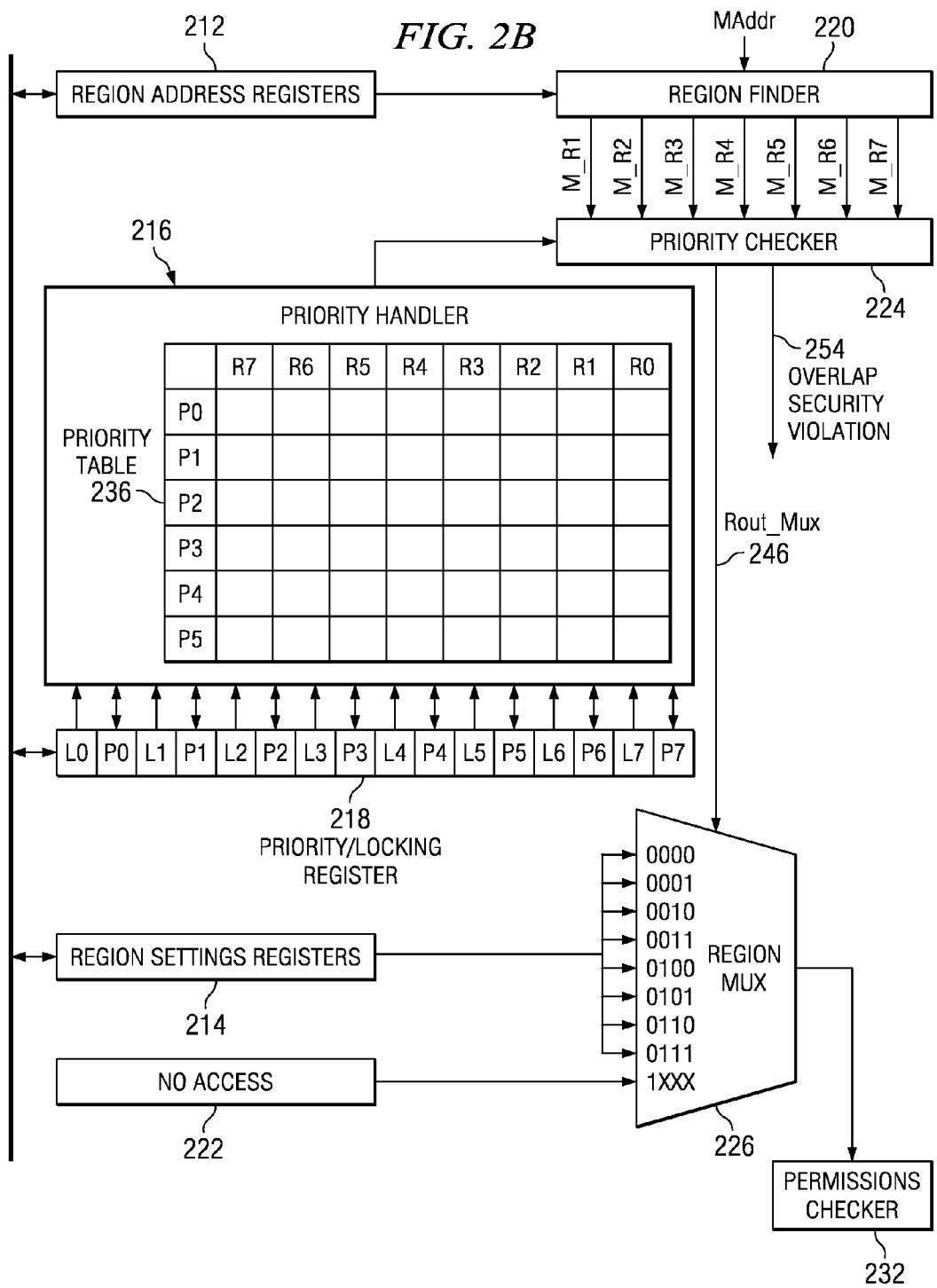
Figures 2C, 4:
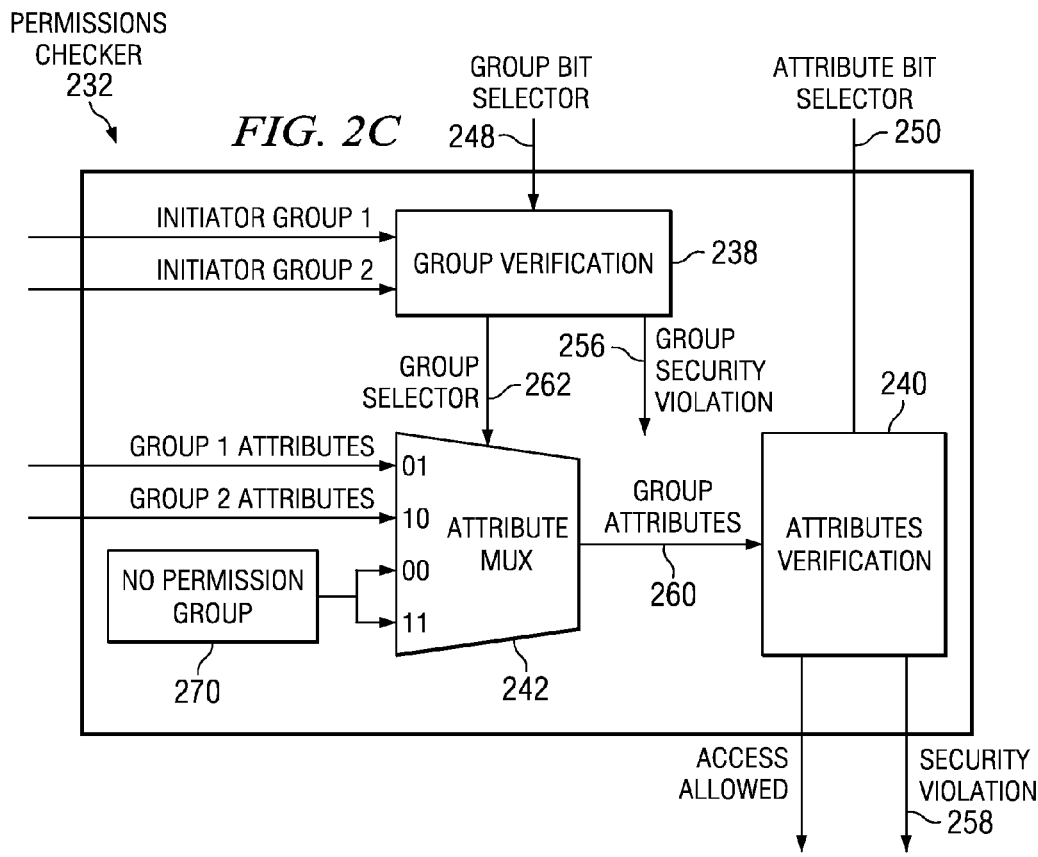

FIGS. 2A-2C show a memory security firewall 200 (e.g., memory security firewalls 150-156 of FIG. 1) in greater detail. The memory security firewall 200 allows the target memory space it is protecting (e.g., one of the memories 118, 120, 146, and 148 of FIG. 1) to be split into multiple memory protection regions. The embodiments of these figures are illustrated and described assuming seven definable memory protection regions, one default memory protection region, and six security priority levels. These embodiments are also illustrated and described with the assumption that the L3 interconnect 116 of FIG. 1 implements the Open Core Protocol (OCP), an openly licensed, core-centric protocol for system-level integration. The OCP defines a comprehensive, bus-independent, high-performance, configurable interface between processor cores and on-chip subsystems. Additional information about OCP may be found on the OCP website, www.ocp-ip.org. However, these assumptions should not be construed as limitations. One of ordinary skill in the art will appreciate other embodiments that may include fewer or more regions and/or priorities, and the use of other interface protocols.

The initiator and target identification information and the access attributes associated with a memory access request that are utilized by the memory security firewall 200 are provided by several OCP parameters including MConnId, MCmd, MAddr, and MReqInfo. MConnId contains a predetermined initiator id that uniquely identifies the initiator of a memory access request. MAddr contains the target address of the memory access request. MCmd indicates whether the memory access request is a read request or a write request. MReqInfo contains additional attributes associated with the memory access request, MReqSecure, MReqDebug, MReqSupervisor, and MRegType. Table 1 shows the definitions of these additional attributes.

TABLE 1

| Attribute Name | Configuration | Definition |
| --- | --- | --- |
| MReqType | 00 CPU data access<br>01 CPU instruction access<br>10 DMA access<br>11 Other | This attribute, when present, indicates if the access request is a processor instruction fetch, a processor data access, or a DMA access |
| MReqSupervisor | 0 User mode transaction<br>1 Supervisor mode transaction | This attribute, when set, indicates that the access request is made in supervisor mode. It can be provided by a processor running in supervisor mode, or by a master module that inherited the attribute from a processor (e.g., a DMA channel with a supervisor mode) |

TABLE 1-continued

| Attribute Name | Configuration | Definition |
| --- | --- | --- |
| MReqDebug | 0 Application access<br>1 Emulator access | This attribute, when set, is used to differentiate a regular access from a processor from an access issued by processor emulation logic. |
| MReqSecure | 0 Normal transaction<br>1 Secure transaction | This attribute, when set, indicates that the access request is made by a processor in secure mode or by a master module that inherited the attribute from a processor (e.g., a DMA channel with a secure mode) |

The memory security firewall 200 includes region configuration logic 264, region selection logic 266 coupled to the region configuration logic 264, and access validation logic 268 coupled to the region selection logic 266 and the security controller 114. The region configuration logic 264 includes the region address registers 212 and the region settings registers 214. The region configuration logic 264 also includes components for managing the priorities and locks of the memory protection regions including a priority/locking register 218 and priority handler logic 216 coupled to the priority/locking register 218. The region selection logic 266 includes region finder logic 220 coupled to the region address registers 212, priority checker logic 224 coupled to the region finder logic 220 and the priority handler logic 216, and region MUX logic 226 coupled to the region settings registers 214 and the priority checker logic 224. The access validation logic 268 includes group encoding lookup logic 228, attributes lookup logic 230, and permission checker logic 232. The permissions checker logic 232 is coupled to the region MUX logic 226, the group encoding lookup logic 228, and the attributes lookup logic 230. The priority checker logic 224 and the permissions checker logic 232 are coupled to the error log registers 244. The permissions checker logic 232 is also coupled to the security controller 114.

The error log registers 244 include two registers, a functional error log register and a debug error log register, that record information regarding a memory access security violation detected by the memory security firewall 200. If system initiator initiating a memory access request is in debug mode and a memory access security violation is detected, the information is recorded in the debug error log register. Otherwise, the security violation information is recorded in the functional error log register. Each of the error log registers contains the fields shown in Table 2.

TABLE 2

| Register Field Name | Contents |
| --- | --- |
| CMD [2:0] | The OCP command code (MCmd) of the memory access request causing the memory access security violation |
| REGION [7:4] | The region number of the memory protection region where the memory access security violation was detected |
| INITIATOR_ID [13:8] | The id of the system initiator (MConnId) initiating the memory access request that resulted in the memory access security violation |
| REQ_INFO [21:16] | The MReqInfo attributes (MReqSecure, MReqDebug, MReqSupervisor, and MRegType) of the memory access request causing the memory access security violation |
| CODE [27:24] | Bits indicting whether or not a memory access security violation has occurred |
| OVERLAP_ERR [28] | Bit indicating if the memory access security violation is due to a region overlap violation |
| GROUP_ERROR [29] | Bit indicating if the memory access security violation is due to the system initiator initiating the memory access request being defined in both initiator groups of the memory protection region |
| MULT [30] | Bit indicating if a second memory access security violation is detected before the first is cleared |

The region address registers 212 include seven register pairs, each pair representing a definable memory protection region. Each register pair holds the start and end address of the represented region. In addition, any memory space of the target memory that is not included in a defined memory protection region is included a default memory protection region. The default memory protection region may be designated as region 0 and the defined memory protection regions may be designated as regions 1-7.

The region setting registers 214 include two region attribute registers and two initiator group registers for each memory protection region, including the default memory protection region. Each initiator group register pair defines the two groups of initiators that are allowed to share access to the memory protection region represented by the register pair. Each bit in an initiator group register represents one system initiator. When the bit in an initiator group register representing a given system initiator is set to one, that system initiator is included in the initiator group represented by the initiator group register. If the bit is set to zero, that system initiator is not included in the initiator group. A system initiator may be included in only one of the two initiator groups defined for a memory protection region. In some embodiments, if a system initiator is included in both initiator groups defined for a memory protection region and that system initiator attempts to access the region, the memory access is blocked and a security violation response is executed.

In at least one embodiment, there may be up to sixteen system initiators, each with a predetermined initiator id 0-15. Each initiator group register includes sixteen bits, one for each of the sixteen system initiators that may be included in the initiator group represented by that register. The bit in the register that represents a given system initiator is determined by the predetermined initiator id of that system initiator. For example, if the processing core 110 of FIG. 1 has a predetermined initiator id of 0, bit 0 of each initiator group register represents the processing core 110. If bit 0 is set to one, then the processing core 110 is included in the initiator group represented by the register. And, if the USB 124 has a predetermined initiator id of 11, bit 11 of each initiator group register represents the USB 124.

Each region attribute register pair encodes the allowed access attribute combinations for the two initiator groups defined for a memory protection region. Each bit in a region attribute register corresponds to a particular combination of access attributes. If the bit is set to 1, a system initiator included in an initiator group defined for a memory protection region is allowed to access the region if it presents the combination of access attributes represented by that bit. Table 3 shows the possible access attribute combinations and the bit in a region attribute register that represents each attribute combination in accordance with some embodiments.

In various embodiments, the memory protection regions have priority levels that are managed by the memory security firewall 200. The priority levels of the regions may be read using the register access interface 234 but may be set/changed only by the memory security firewall 200. The registers defining the memory protection regions, the region address registers 212 and the region settings registers 214, may also be locked once they have been programmed as an additional level of security. Once these registers are programmed and locked, they may only be re-programmed by a secure access until a hard reset of the system 100 occurs (e.g., the system 100 is turned off and back on again). Also, when the registers are locked, the memory security firewall 200 automatically raises the priority of that memory protection region to forestall potential corruption by a public access to another memory protection region that overlaps it.

The priority/lock register 218 contains the security priority level and lock status of each memory protection region. The security priority level and lock status of each memory protection region is represented with four consecutive bits, one bit for the lock status (on/off) and three bits for the security priority level.

The memory security firewall 200 implements six security priority levels designated level 0 to level 5, with level 0 being the lowest priority. The default memory protection region, region 0, has a default security priority level of 0. The protection region designated as region 1 has a default security priority level of 2 when programmed and unlocked. The secu-

TABLE 3

| Security<br>0 Public<br>1 Secure | Debug<br>0 Functional<br>1 Debug | Privilege<br>0 User<br>1 Supervisor | Data/Opcode<br>0 Data transfer<br>1 Opcode fetch | Read/Write<br>0 Read Allowed<br>1 Write Allowed | Register Bit |
|---|---|---|---|---|---|
| 0 | 0 | 0 | 0 | 0 | 0 |
| 0 | 0 | 0 | 0 | 1 | 1 |
| 0 | 0 | 0 | 1 | 0 | 2 |
| 0 | 0 | 0 | 1 | 1 | 3 |
| 0 | 0 | 1 | 0 | 0 | 4 |
| 0 | 0 | 1 | 0 | 1 | 5 |
| 0 | 0 | 1 | 1 | 0 | 6 |
| 0 | 0 | 1 | 1 | 1 | 7 |
| 0 | 1 | 0 | 0 | 0 | 8 |
| 0 | 1 | 0 | 0 | 1 | 9 |
| 0 | 1 | 0 | 1 | 0 | 10 |
| 0 | 1 | 0 | 1 | 1 | 11 |
| 0 | 1 | 1 | 0 | 0 | 12 |
| 0 | 1 | 1 | 0 | 1 | 13 |
| 0 | 1 | 1 | 1 | 0 | 14 |
| 0 | 1 | 1 | 1 | 1 | 15 |
| 1 | 0 | 0 | 0 | 0 | 16 |
| 1 | 0 | 0 | 0 | 1 | 17 |
| 1 | 0 | 0 | 1 | 0 | 18 |
| 1 | 0 | 0 | 1 | 1 | 19 |
| 1 | 0 | 1 | 0 | 0 | 20 |
| 1 | 0 | 1 | 0 | 1 | 21 |
| 1 | 0 | 1 | 1 | 0 | 22 |
| 1 | 0 | 1 | 1 | 1 | 23 |
| 1 | 1 | 0 | 0 | 0 | 24 |
| 1 | 1 | 0 | 0 | 1 | 25 |
| 1 | 1 | 0 | 1 | 0 | 26 |
| 1 | 1 | 0 | 1 | 1 | 27 |
| 1 | 1 | 1 | 0 | 0 | 28 |
| 1 | 1 | 1 | 0 | 1 | 29 |
| 1 | 1 | 1 | 1 | 0 | 30 |
| 1 | 1 | 1 | 1 | 1 | 31 | rity priority level of region 1 is automatically changed to 3 when the region is locked by a public access and to 5 when the region is locked by a secure access. The remaining protection regions, regions 2-7, have a default security priority level of 1 when programmed and unlocked. The security priority levels of these regions are automatically changed to 3 when locked by a public access and to 4 when locked by a secure access.

The region address register 212, the region settings registers 214, and the lock bits of the priority/locking register 218 may be programmed through the register access interface 234. Memory protection region configuration software may be executed on core 112 to configure memory protection regions in the memory security firewall 200. In some embodiments, to define a memory protection region, the configuration software first defines the members of the two initiator groups that will share access to the memory protection region and the access attributes that must be presented. Such definitions are accomplished by setting the appropriate bits in the region attribute register pair and the initiator group register pair of the region settings registers 214 for the memory protection region to be configured. The configuration software then defines the boundaries of the memory protection region by placing the start and end addresses of the memory range to be protected in the register pair of the region address registers 212 representing the memory protection region. Once the register pair of the regions address registers 212 is programmed, the firewall is activated for that memory protection region. The default security priority level of the newly configured memory protection region is automatically set in the appropriate field of the priority/locking register 218 by the memory security firewall 200. The configuration software may then optionally lock these newly programmed registers by turning on the appropriate lock bit in the priority/locking register 218. If the lock bit is turned on, the memory security firewall 200 will then automatically raise the security priority level of the newly programmed memory protection region.

For example, if memory protection region 2 is to be configured, the configuration software defines which of the system initiators may access region 2 by setting the bits representing those system initiators in one of the two initiator group registers of region 2. The configuration software also defines the permissible access attribute combinations that may be presented by system initiators included in each of the two initiator groups by setting the bits representing the allowable combinations in the region attribute registers for region 2. Once the initiator group registers and the region attribute registers are programmed, the configuration software then activates the firewall protection for region 2 by placing the start and end addresses of the memory range to be protected as region 2 in the region address registers defining region 2. The memory security firewall 200 sets the priority bits for region 2 in the priority/locking registers 218 to 1, the default security priority level for region 2. If the configuration software is executing in public mode and locks the region 2 registers by setting the region 2 lock bit in the priority/locking register 218, the memory security firewall 200 automatically sets the region 2 priority bits to 3. If the configuration software is executing in secure mode and locks the region 2 registers by setting the region 2 lock bit in the priority/locking register 218, the memory security firewall 200 automatically sets the region 2 priority bits to 4.

The memory security firewall 200 provides for dynamic configuration of the memory protection regions. That is, memory protection regions may be initially configured or reconfigured at any time while the system 100 is active. The permissible security priority levels of region 1 are defined such that region 1 may be configured to protect any of the other active memory protection regions, i.e. regions 2-7, while one of these regions is being reconfigured. For example, assume that memory protection region 2 is active and has been locked by the configuration software operating in secure mode so the security priority level of the region is 4. If the need arises to increase the size of the memory space for the region, the configuration software may configure region 1 such that it overlays the memory space currently defined as region 2 and the memory space to be added to region 2. The configuration software may also configure the region attribute registers and the initiator group registers of region 1 to duplicate those of region 2. The configuration software may then lock region 1 in secure mode, thus raising the security priority level of region 1 to security priority level 5. Once region 1 is activated, all memory access requests to region 2 and the memory space to be added to region 2 are handled as region 1 access requests because of region 1 has the highest security priority level. The configuration software may then deactivate and reconfigure region 2 and the memory space will be protected during the reconfiguration process. Once the region 2 registers have been reconfigured and region 2 is again activated, region 1 may be deactivated.

FIG. 2B shows the portion of the memory security firewall 200 that handles locking, region priority, and region selection in greater detail. FIGS. 3, 4, 5A and 5B contain pseudo code illustrating the operation of the region finder logic 220, the priority handler 216, and the priority checker 224, respectively. In this pseudo code, R0-R7 are identifiers for the memory protection regions. Start_Rx and End_Rx are identifiers for the register pair of the region address registers 212 that contain the start and end addresses of memory protection region x. When used in reference to the priority table 236, P0-P5 are identifiers for memory security priority levels. When used in reference to the priority/locking register 218, P0-P7 are identifiers for the memory security priority level of the correspondingly numbered memory protection region. Ptable is the identifier for the priority table 236. L_Rx is the identifier for the lock status of memory protection region x in the priority/locking register 218. MAddr identifies the target address of an access request and MSecure is an identifier indicating whether the current execution mode is public or secure.

The region finder logic 220 accepts as input the address of a target memory access request, MAddr. As is illustrated in the pseudo code of FIG. 3, the region finder logic compares this address to the start and end addresses of each memory protection region to determine which of these memory protection regions includes the address. Because memory protection regions may overlap, the address may be included in more than region. The region finder logic passes seven values, M_Rx, to the priority checker logic 224. If the address is included in memory protection region x, the value of M_Rx is set to x. If the address is not included in memory protection region x, the value of M_Rx is set to 0.

The priority handler logic 216 manages the security priority levels of the memory protection regions. As part of this priority management function, the priority handler logic 216 sets the priority fields of the priority/locking register 218 and maintains a priority table 236 that is used by the priority logic 224. The priority table 236 includes an entry for each possible combination of region and priority. This entry will be 1 if a region has the associated security priority level and will be 0 otherwise. For example, if region 1 has security priority level 2, the entry in the priority table 236 corresponding to P2 and R1 is 1. All other entries in the priority table 236 corresponding to R1 are 0.

When the system 100 is initialized or otherwise reset, the priority handler logic 216 initializes the priority fields of the priority/locking register 218 and the entries of the priority table 236 to correspond to the default priority levels of the memory protection regions. As was previously discussed, region 0 has a default security priority level of 0, region 1 has a default security priority level of 2, and regions 2-7 have a default security priority level of 1. While the system 100 is operating, the priority handler logic 216 automatically changes the security priority level of the definable memory protection regions, regions 1-7, responsive to changes in the locking status of those regions. If region 1 is locked by a public access, the priority handler logic 216 raises the security priority level of the region to 3. If region 1 is locked by a secure access, the priority handler logic 216 raises the security priority level of the region to 5. If regions 2-7 are locked by a public access, the priority handler logic 216 raises the security priority level of these regions to 3. If regions 2-7 are locked by a secure access, the priority handler logic 216 raises the security priority level of these regions to 4. In executing these priority changes, the priority handler 216 updates the appropriate priority field in the priority/locking register 218 and makes any needed changes to the priority table 236. The pseudo code of FIG. 4 illustrates the operation of the priority handler logic 216.

The priority checker logic 224 selects the memory protection region to be used for verifying access permissions when an address is included in more than one protection region. When an address is included in more than one memory protection region, the priority checker logic 224 selects the region with the highest priority. If, during the process of identifying the region with the highest priority, the priority checker logic 224 determines that the overlapping regions including an address have the same priority, an overlap security violation 254 is detected. The overlap security violation 254 is logged in the error log registers 244 and the output of the priority checker logic 224, Rout_Mux 246, is set to cause the permissions checker logic 232 to indicate a memory access security violation. If no overlap security violation 254 is detected, Rout_Mux 246 is set to a four bit value corresponding to the number of the selected region.

Referring now to the pseudo code shown in FIGS. 5A and 5B, the priority checker logic 224 first checks for an overlap security violation 254 (lines 1-17). The sum of the entries in the priority table 236 for each priority level for each M_Rx value passed by the region finder logic 220 is calculated (lines 1-5). Recall that an M_Rx value is the number of a region if the address was included in the region and is 0 otherwise. Also note that the entries that are selected when an M_Rx value is 0 correspond to region 0, which always has a security priority level of 0. Once the sums of the priority levels are calculated, a check is made for an overlap security violation 254 (lines 11-16). An overlap security violation 254 is indicated under the following circumstances: (1) if the sum of the relevant priority level 5 entries is greater than 1, denoting that at least two regions contain the address and have a priority level of 5; or, (2) for each of the priority levels 1-4, if the sum of the entries for each priority level higher than the one under consideration is 0 and the sum of the priority level entries for the priority level under consideration is greater than 1. The output of this overlap checking process is a one bit value, Violation, which is 1 if an overlap security violation 254 is found and 0 otherwise.

The priority checker logic also selects the highest priority region from among the regions corresponding to the non-zero M_Rx inputs (lines 19-55). The output of this selection process is a three bit value, Rout, the number of the selected region. Rout_Mux 246, the output of the priority checker logic 224, is formed by concatenating the violation value and Rout (line 57).

The region MUX 226 is multiplexer logic that selects which of the region settings registers 214 are to be used by the permissions checker logic 232 to determine if a memory access request is allowed. The selector for the region MUX 226 is the output value of the priority checker logic 224, Rout_Mux 246. The inputs to the region MUX 226 are the sets of initiator group registers and region attribute registers that correspond to each memory protection region and a hardwired no access input 222. The no access input 222 is selected as the region settings output 252 of region MUX 226 if an overlap security violation 254 was detected by the priority checker logic 224. Otherwise, the set of initiator group registers and region attribute registers corresponding to the region selected by the priority checker logic 224 is selected as the region settings output 252.

Referring again to FIG. 2A, the group encoding logic 226 receives as input ihe initiator id, MConnId, of the system initiator initiating a memory access request. The group encoder logic 228 performs any translation necessary to convert the received initiator id into a four bit value, the group bit selector 248, which designates the bit of an initiator group register representing the system initiator.

The attributes lookup logic 230 receives as input the attributes of a memory access request, i.e., MCmd and MReqInfo. As is illustrated in the pseudo code of FIG. 7, the attribute lookup logic 230 uses the relevant bits of MReqInfo and the read/write indication of MCmd to create a five bit value, MReqInfo_int that encodes the access attribute combination of the memory access request. The five bit MReqInfo_int value is then used to look up in an attributes encoding table (not specifically shown) the number of the bit in a region attribute register that corresponds to the access attribute combination (See Table 3). The output of the attributes lookup logic 230, the attribute bit selector 250, is the bit number from the attributes encoding table.

FIG. 2C shows the permissions checker logic 232 in more detail. The permissions checker logic 232 checks that the system initiator initiating a memory access request is included in one of the initiator groups defined for the memory protection region selected by the region finder logic 220 and the priority checker logic 224. If the initiator is included in both initiator groups of the memory protection region, the permissions checker logic 232 signals a group security violation 256 and initiates a security violation response. The permissions checker logic 232 also verifies that attributes of the memory access request are permissible attributes for the initiator group of which the initiator is a member. If this verification fails, the permissions check logic 232 signals an memory access security violation 258 and initiates a security violation response. Otherwise, the permissions checker logic 232 allows the memory access.

The permissions checker logic 232 includes group verification logic 238, an attribute MUX 242 coupled to the group verification logic 238, and attributes verification logic 240 coupled to the attribute MUX 242. The group verification logic 238 determines whether the initiator of a memory access request is included in one of the two initiator groups defined for the memory protection region identified by the region finder logic 220 and the priority checker logic 224. The group verification logic receives as input the group bit selector 248 from the group encoding logic 228 and the initiator group registers selected by the region MUX 226. As is shown in pseudo code of FIG. 6, the group verification logic 238 reads the values of the bits in each of the initiator group registers that correspond to the group bit selector 248 (lines 1-2). Note that the group bit selector 248 is designated as SEL_Init_ID in this pseudo code. Theses two values are concatenated to create a two bit group selector value 262 (line 4) that constitutes the output of the group verification logic 238.

If both values are 1 (line 5), the initiator is included in both initiator groups and a group security violation 256 is detected. The group security violation 256 is logged in the error log registers 244 and the group selector value 262 is set to cause the attributes verification logic 240 to indicate a memory access security violation. If both values are 0, the initiator is not included in either initiator group and a memory security violation is detected. The group selector value 262 is set to cause the attributes verification logic 240 to indicate a memory access security violation 258.

The attribute MUX 242 is multiplexer logic that selects which of the two region attribute registers selected by the region MUX 226 is to be used by the attributes verification logic 240 to determine if a memory access request has permissible access attributes. The attribute MUX 242 selects the region attribute register that corresponds to the initiator group identified by the group verification logic 238. The selector for the attribute MUX 242 is the group selector 262 from the group verification logic 238. The inputs to the attribute MUX 242 are the region attribute registers selected by the region MUX 226, and hardwired no permission group inputs 270. The hardwired inputs 270 are selected as the group attributes output 260 of the attribute MUX 242 if a group security violation 256 was detected by the group verification logic 238 or if the group verification logic 238 determined that the initiator was not included in either of the initiator groups defined for the memory protection region. Otherwise, the region attribute register corresponding to the initiator group including the initiator is selected as the group attributes output 260.

The attributes verification logic 240 determines whether the access attributes of a memory access request are permissible attributes for the memory protection region addressed by the memory access request. The attributes verification logic 240 receives as input the attribute bit selector 250 generated by the attributes lookup logic 230 and the group attributes output 260 of the attribute MUX 242. As is shown in the pseudo code of FIG. 8, if the bit indicated by the attribute bit selector 250 is set to one in the group attributes, the attributes verification logic 240 allows the memory access request (lines 1-4). Otherwise, the attributes verification logic 240 detects a memory access security violation 258 (lines 6-8) and initiates a security violation response. Note that in this pseudo code, Req_Info represents the group attributes output 260 and Sel_Attribute represents the attribute bit selector 250.

Figures 8, 9:
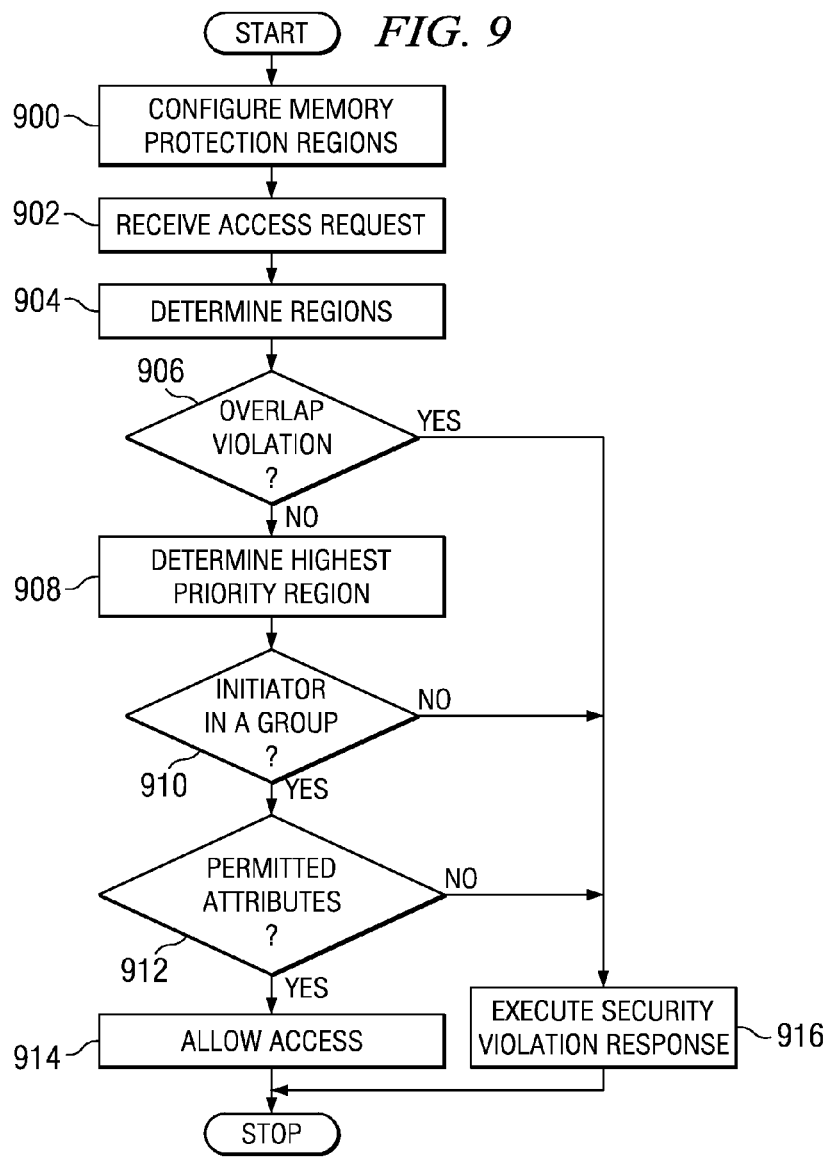

FIG. 9 is a flow chart of a method for controlling access to a target memory in accordance with one or more embodiments. Although the actions of this method are presented and described serially, one of ordinary skill in the art will appreciate that the order may differ and/or some of the actions may occur in parallel. The method begins with the configuration of one or more memory protection regions in a target memory (block 900). Each memory protection region is configured with a start and end address of a memory range within the target memory. The configured memory protection regions may overlap and are assigned a security priority level that may be used to determine which memory protection region is selected for access validation when a memory access request addresses a memory location that is configured in more than one region. In addition, two groups of system initiators that are permitted to access the memory protection region are defined. Two sets of permissible access attribute combinations are also defined, one set for each of the two groups of system initiators.

Once one or more memory protection regions are configured, all memory access requests that address the target memory are checked to determine if the access request is to be allowed (blocks 902-916). Each memory access request includes information identifying the system initiator making the request, the address of the memory location in the target memory space to be accessed, and a combination of access attributes. When a memory access request addressing the target memory is received from an system initiator (block 902), the memory protection region or regions that include the address of the memory access request are determined (block 904). A check is made to determine if there is an overlap security violation (block 906). If at least two memory protection regions include the address, and share the highest security priority level of any region including the address, an overlap security violation is indicated and a security violation response is executed (block 916).

If there is no overlap security violation, the highest priority region including the address is determined (block 908). A check is made to determine if the system initiator making the memory access request is included in either of the two groups of system initiators that are allowed to access the selected memory protection region (block 910). If the system initiator is not included in either group or if it is included in both groups, a group security violation is detected and a security violation response is executed (block 916).

If there is no group security violation, the combination of access attributes of the memory access request is checked against the set of permissible access attribute combinations defined for the group of system initiators including the system initiator making the request (block 912). If the combination of access attributes is included in the set of permissible access attribute combinations, the memory access request is allowed (block 914). Otherwise, a memory access security violation is indicated and a security violation response is executed (block 916).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for controlling access to a target memory, the method comprising:

configuring a plurality of memory protection regions in a target memory of a system and automatically assigning a security priority level to each of the memory protection regions, the system comprising a plurality of system initiators, wherein the configuring comprises defining a first initiator group with a first set of access attribute combinations and a second initiator group with a second set of access attribute combinations for each memory protection region of the plurality of memory protection regions, wherein the first and second initiator groups comprise one or more of the plurality of system initiators;

receiving a memory access request from a system initiator of the plurality of system initiators, the memory access request comprising an address in the target memory and a combination of access attributes;

executing a security violation response if the address is in a first memory protection region and a second memory protection region of the plurality of memory protection regions and the security priority level of the first memory protection region is the same as the security priority level of the second memory protection region;

if the address is in a first protection region of the plurality of memory protection regions, allowing the memory access request if the system initiator is in the first initiator group of the first memory protection region and the combination of access attributes is in the first set of access attribute combinations of the first initiator group; and allowing the memory access request if the system initiator is in the second initiator group of the first memory protection region and the combination of access attributes is in a second set of access attribute combinations of the second initiator group.

2. The method of claim 1, further comprising:
executing a security violation response if the system initiator is in the first initiator group and the second initiator group.

3. The method of claim 1, further comprising:
executing a security violation response if the system initiator is in one of the initiator groups and the combination of access attributes is not in the set of access attribute combinations of the initiator group comprising the system initiator.

4. The method of claim 1, further comprising locking a memory protection region of the plurality of memory protection regions wherein a second security priority level that is higher in priority than the assigned security priority level is automatically assigned to the memory protection region.

5. The method of claim 1, further comprising:
if the address is in the first memory protection region and a second memory protection region of the plurality of memory protection regions and the security priority level of the first memory protection region is higher than the security priority level of the second memory protection region:
   allowing the memory access request if the system initiator is in the first initiator group and the combination of access attributes is in the first set of access attribute combinations; and
   allowing the memory access request if the system initiator is in the second initiator group and the combination of access attributes is in the second set of access attribute combinations.

6. The method of claim 1, wherein executing a security violation response further comprises selecting at least one response option of a plurality of response options, the plurality of response options comprising preventing execution of an instruction within a processor core of the system, asserting an interrupt signal to the processor core wherein security response software is executed in response to the asserted interrupt signal, asserting a warm reset signal to the processor core, causing the processor core to enter debug mode, and activating an attack indicator.

7. The method of claim 1, wherein the system is a mobile device.

8. The method of claim 1, wherein at least one of the system initiators is a hardware device.

9. A system, comprising:
a plurality of system initiators coupled to an interconnect of the system;
a target memory coupled to the interconnect; and
a memory security firewall coupled to the interconnect wherein the memory security firewall is operable to configure a plurality of memory protection regions in the target memory and automatically assign a security priority level to each of the memory protection regions, wherein the configuration comprises:
   defining a first initiator group with a first set of access attribute combinations and a second initiator group with a second set of access attribute combinations for each memory protection region of the plurality of memory protection regions, wherein the first and second initiator groups comprise:
      one or more of the plurality of system initiators, to receive a memory access request from a system initiator of the plurality of system initiators, the memory access request comprising an address in the target memory and a combination of access attributes, to determine whether the address is in a first memory protection region of the plurality of memory protection regions, and if the address is in the first memory protection region, to block the memory access request unless the system initiator is in the first initiator group of the first memory protection region and the combination of access attributes is in the first set of access attribute combinations of the first initiator group, or the system initiator is in the second initiator group of the first memory protection region and the combination of access attributes is in the second set of access attribute combinations of the second initiator group; and
   wherein the memory security firewall is further operable:
      to execute a security violation response if the address is in a first and a second of the memory protection regions and the security priority level of the first memory protection region is the same as the security priority level of the second memory protection region.

10. The system of claim 9, wherein the memory security firewall is further operable to block the memory access request if the system initiator is in the first initiator group and the second initiator group.

11. The system of claim 9, wherein the memory security firewall is further operable to block the memory access request if the system initiator is in one of the initiator groups and the combination of access attributes is not in the set of access attribute combinations of the initiator group comprising the system initiator.

12. The system of claim 9, wherein the memory security firewall is further operable to lock a memory protection region of the plurality of memory protection regions wherein a second security priority level that is higher in priority than the assigned security priority level is automatically assigned to the memory protection region.

13. The system of claim 9, wherein the memory security firewall is further operable:
to determine whether the address is in the first memory protection region and the second memory protection region of the plurality of memory protection regions, and
if the address is in both memory protection regions and the security priority level of the first memory protection region is higher than the security priority level of the second memory protection region:
   to block the memory access request unless the system initiator is in the first initiator group and the combination of access attributes is in the first set of access attribute combinations, or the system initiator is in the second initiator group and the combination of access attributes is in the second set of access attribute combinations.

14. The system of claim 9, wherein the memory security firewall is further operable to block the memory access request if the address is in the first memory protection region and a second memory protection region of the plurality of memory protection regions and the security priority level of the first memory protection region is the same as the security priority level of the second memory protection region.

15. The system of claim 9, wherein the memory security firewall is further operable to cause the execution of a security violation response if the firewall blocks the memory access request.

16. The system of claim 15, wherein execution of a security violation response comprises selecting at least one response option of a plurality of response options, the plurality of response options comprising preventing execution of an instruction within a processor core of the system, asserting an interrupt signal to the processor core wherein security response software is executed in response to the asserted interrupt signal, asserting a warm reset signal to the processor core, causing the processor core to enter debug mode, and activating an attack indicator.

17. The system of claim 9, wherein the system is a mobile device.

18. The system of claim 9, wherein at least one of the system initiators is a hardware device.

19. A memory security firewall apparatus, comprising:
   region configuration logic, wherein the region configuration logic is operable to define a plurality of memory protection regions of a target memory of a system and automatically assign a security priority level to each of the memory protection regions, each memory protection region having a first initiator group with a first set of access attribute combinations, and a second initiator group with a second set of access attribute combinations;
   region selection logic coupled to the region configuration logic and coupled to an interconnect of the system to receive an address of a memory access request from a system initiator, wherein the region selection logic is operable to select a memory protection region of the plurality of memory protection regions that includes the address;
   access validation logic coupled to the region selection logic and coupled to the interconnect to receive an initiator id of the system initiator and to receive a combination of access attributes of the memory access request, wherein the access validation logic is operable to allow the requested memory access if the system initiator is in the first initiator group of the memory protection region selected by the region selection logic, and the combination of access attributes is in the first set of access combinations, or if the system initiator is in the second initiator group of the memory protection region selected by the region selection logic, and the combination of access attributes is in the second set of access combinations; and
   circuitry for executing a security violation response if the address is in a first memory protection region and a second memory protection region of the plurality of memory protection regions and the security priority level of the first memory protection region is the same as the security priority level of the second memory protection region.

20. The memory security firewall apparatus of claim 19, wherein the access validation logic is operable to block the requested memory access if the system initiator is in the first initiator group and the second initiator group.

21. The memory security firewall apparatus of claim 19, wherein the access validation logic is operable to block the requested memory access if the system initiator is in one of the first and second initiator groups and the combination of access attributes is not in the set of access attribute combinations of the initiator group comprising the system initiator.

22. The memory security firewall apparatus of claim 19, wherein the region configuration logic is operable to assign a security priority level to each memory protection region of the plurality of memory protection regions, and wherein the region selection logic is operable to select the first memory protection region if the address is included in a first memory protection region and a second memory protection region of the plurality of memory protection regions and the security priority level of the first memory protection region is higher than the security priority level of the second memory protection region.

23. The memory security firewall apparatus of claim 22, wherein the region configuration logic is operable to assign a second security priority level that is higher than the assigned security priority level to a memory protection region of the plurality of memory protection regions when the memory protection region is locked.

24. The memory security firewall apparatus of claim 22, wherein the access validation logic is operable to block the memory access request if the address is included in the first memory protection region and the second memory protection region and the security priority level of the first memory protection region is the same as the security priority level of the second memory protection region.

25. The memory security firewall apparatus of claim 19, wherein the system is a mobile device.

26. The apparatus of claim 19, wherein at least one of the system initiators is a hardware device.

* * * * *